(12) United States Patent
Maddy (10) Patent No.: US 11,035,465 B2
(45) Date of Patent: Jun. 15, 2021

(54) GEARBOX PARKING BRAKE

(71) Applicant: Gale Maddy, Greeneville, TN (US)

(72) Inventor: Gale Maddy, Greeneville, TN (US)

(\*) Notice: Subject to any disclaimer, the term of this patent is extended or adjusted under 35 U.S.C. 154(b) by 67 days.

(21) Appl. No.: 16/721,912

(22) Filed: Dec. 19, 2019

(65) Prior Publication Data
US 2020/0200269 A1 Jun. 25, 2020

Related U.S. Application Data

(60) Provisional application No. 62/782,063, filed on Dec. 19, 2018.

(51) Int. Cl.
| | |
|---|---|
| *B62D 11/14* | (2006.01) |
| *F16H 48/20* | (2012.01) |
| *F16H 63/34* | (2006.01) |
| *B62D 11/10* | (2006.01) |

(52) U.S. Cl.
CPC ......... *F16H 63/3425* (2013.01); *B62D 11/10* (2013.01); *F16H 63/3416* (2013.01)

(58) Field of Classification Search
CPC ....................... F16H 63/3416–3491; F16H 2048/305–48/34; F16H 48/00–2048/426; F16H 48/10–11; B62D 11/10; B62D 11/12; B62D 11/14; B62D 11/16
See application file for complete search history.

(56) References Cited

U.S. PATENT DOCUMENTS

| | | | | |
|---|---|---|---|---|
| 4,917,200 A | * | 4/1990 | Lucius | B62D 11/10 180/6.2 |
| 5,722,501 A | * | 3/1998 | Finch | B60K 1/00 180/6.44 |
| 6,336,513 B1 | * | 1/2002 | Hasegawa | B62D 9/00 180/6.2 |
| 2016/0194026 A1 | * | 7/2016 | Maddy | F16H 57/082 475/28 |
| 2018/0363755 A1 | * | 12/2018 | Wakui | F16H 57/025 |

\* cited by examiner

*Primary Examiner* — Charles A Fox
*Assistant Examiner* — Farhana Pervin (57) ABSTRACT

A gearbox parking brake has a gearing assembly in which two or more interconnected gears can rotate at different directions or speeds. A first and second planetary gear assembly and a central gear are concentrically positioned about a central rotation axis, and the central gear is rotatably engaged with the two planetary gear assemblies. An input is engaged with the central gear in order to operate the planetary gear assemblies, which may function as outputs. A gear engagement block is provided with sets of gear teeth corresponding to the planetary gear assemblies and the central gear. An actuator mechanism is operatively connected to the gear engagement block in order to displace the gear engagement block between a disengaged position and an engaged position. The gear teeth of the gear engagement block are meshed with the gearing assembly in the engaged position, restricting any movement of the gearing assembly.

9 Claims, 10 Drawing Sheets

GEARBOX PARKING BRAKE

The current application claims a priority to the U.S. Provisional Patent application Ser. No. 62/782,063 filed on Dec. 19, 2018.

FIELD OF THE INVENTION

The present invention relates generally to vehicles and gear assemblies. More particularly, the present invention is a vehicular parking brake arrangement utilizing gear engagement to restrict motion of a gearbox.

BACKGROUND OF THE INVENTION

The present invention serves as a parking brake for a vehicle that is propelled by a gear train in which two or more interconnected gears rotate at different directions or speeds. The introduction of a gear block ties the two or more gears together such that their relative rotational speeds to each other are zero. This provides for an inexpensive and effective parking brake.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary m some instances, and should not be considered to be limiting to the scope of the present invention as a whole.

In general, referring to FIGS. 1-5, the present invention comprises a gearing assembly 1, a gear engagement block 2, and an actuator mechanism 3. It is contemplated that the gearing assembly 1 may vary in different embodiments, but generally the gearing assembly 1 is configured to transmit an angular input force received from a power source to two laterally opposed, axially aligned outputs. Said outputs may serve to drive wheels of a vehicle, such as, but not limited to, a zero turn riding (ZTR) mower or other comparable mobile equipment.

In the preferred embodiment of the present invention, the gearing assembly 1 comprises a first planetary gear assembly 11, a second planetary gear assembly 12, a central gear 13, a plurality of connecting shafts 14, a propelling input 15, and a steering input 16.

The first planetary gear assembly 11, the second planetary gear assembly 12, and the central gear 13 are concentrically positioned about a central rotation axis 100. The central gear 13 is positioned between the first planetary gear assembly 11 and the second planetary gear assembly 12. The propelling input 15 is operatively engaged with the central gear 13, such that the propelling input 15 is configured to transmit angular force from a power source to the central gear 13 in order to rotate the central gear 13 about the central rotation axis 100. In various embodiments, the propelling input 15 may vary; however, in the preferred embodiment, the propelling input 15 is an external spur gear, as is the central gear 13. It may be understood that the various gears described herein may vary in different embodiments. For example, in some embodiments, certain gears may be external spur gears, while in other embodiments the same certain gears may be external bevel gears. It should be understood that the such variations in gear type may not necessarily affect the spirit and scope of the present invention as herein disclosed, so long as the geometric arrangement of the gearing assembly 1 is constructed according to the intended purpose. It may be further considered that alternative gearing arrangements for the gearing assembly 1 may be implemented in alternative embodiments, so long as the gearing assembly 1 may be restricted from motion through the engagement of the gear engagement block 2 with the gearing assembly 1, wherein the gear engagement block 2 interfaces with multiple gears of the gearing assembly 1 in such a manner that the gears of the gearing assembly 1 are prevented from turning while the gear engagement block 2 is engaged with the gearing assembly 1.

In the preferred embodiment, the first planetary gear assembly 11 and the second planetary gear assembly 12 each comprise a ring gear 17, a sun gear 18, and a plurality of planet gears 19. In some embodiments, the plurality of planet gears 19 may comprise two planet gears 19. In some embodiments, the plurality of planet gears 19 may comprise more than two planet gears 19. Each of the plurality of planet gears 19 is operatively engaged between the sun gear 18 and the ring gear 17 for both the first planetary gear assembly 11 and the second planetary gear assembly 12. In general, the first planetary gear assembly 11 and the second planetary gear assembly 12 may be understood to be identical, but this should not be a necessarily restrictive limitation; it is contemplated that the first planetary gear assembly 11 and the second planetary gear assembly 12 may differ from each other in some embodiments while still fulfilling the intended purpose and spirit of the present invention.

Figure 1:
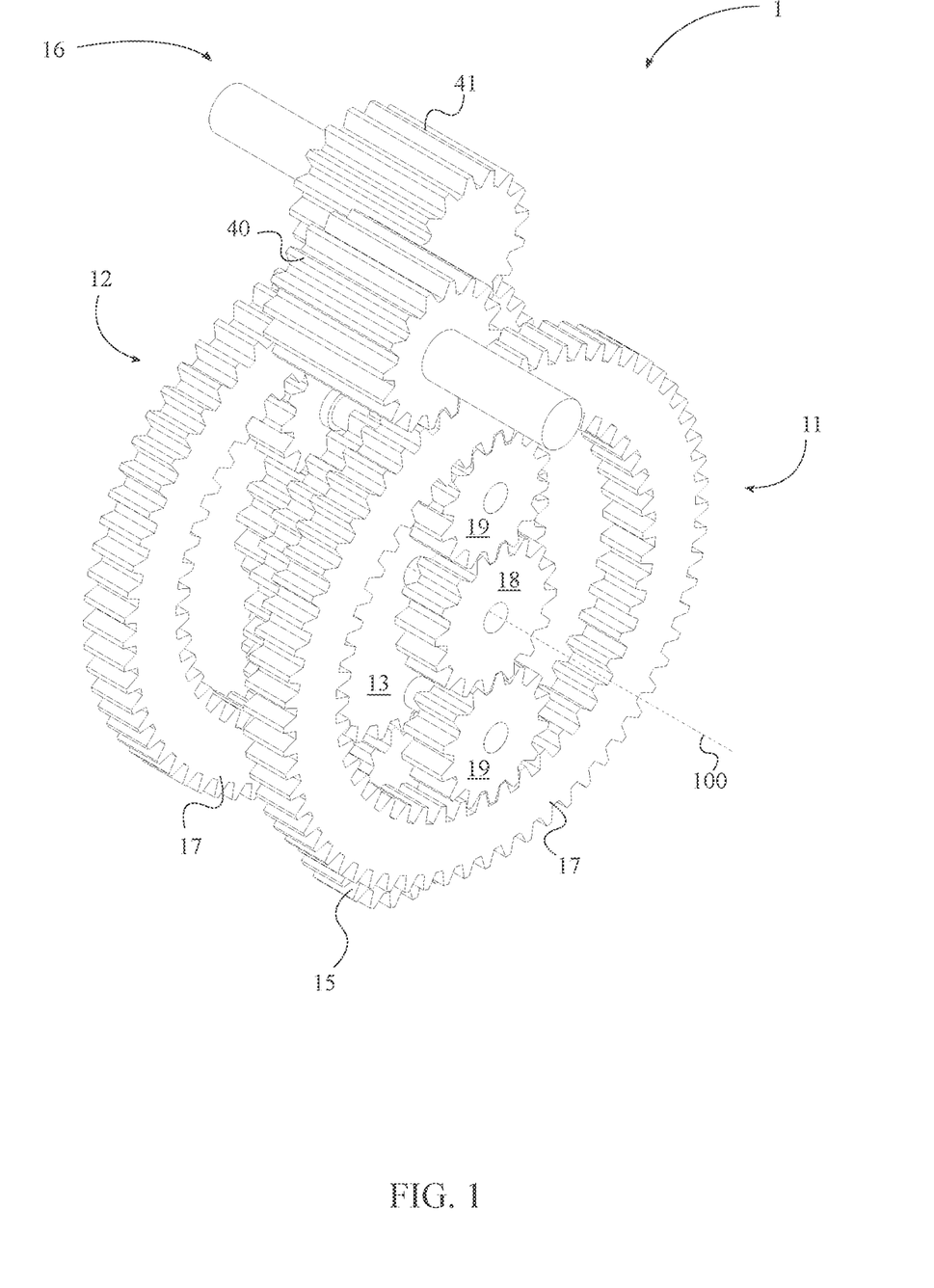
FIG. 1 is a perspective view of the gearing assembly in accordance with some embodiments of the present invention.
Figure 2:
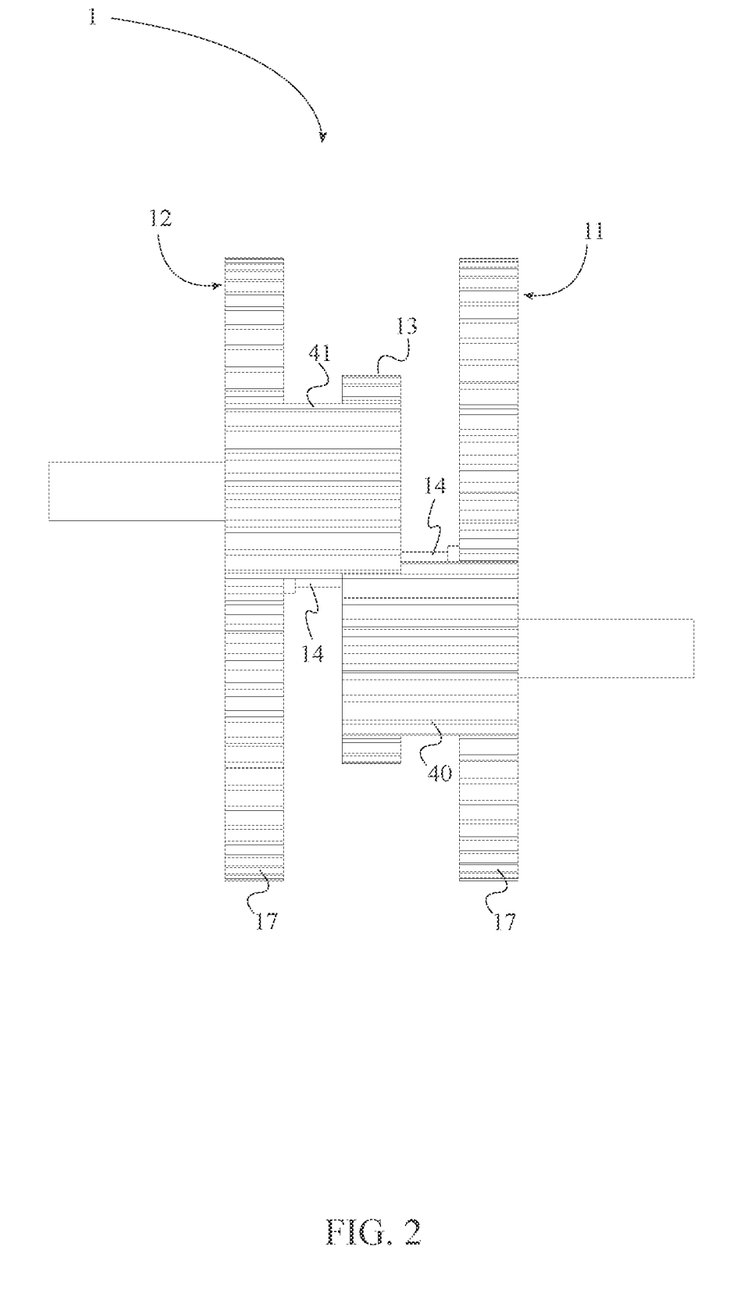
FIG. 2 is a top view of the gearing assembly in accordance with some embodiments of the present invention.
Figure 3:
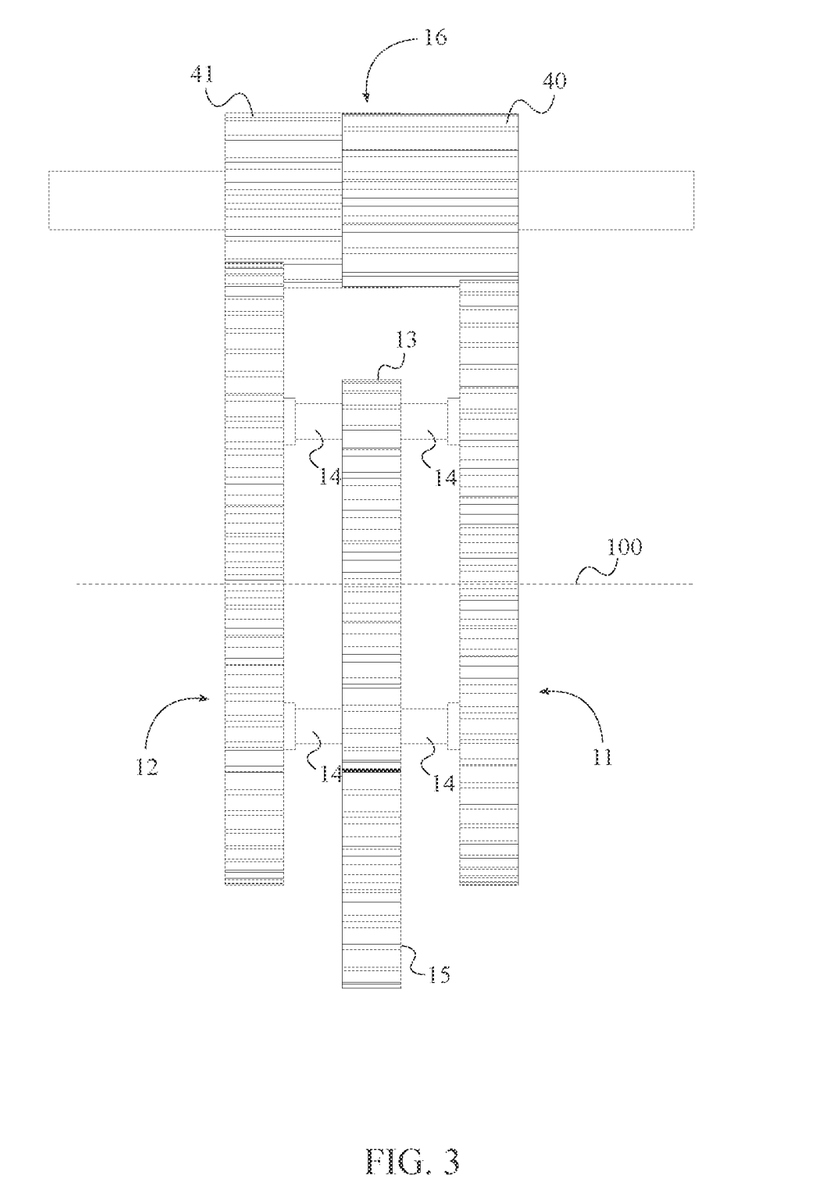
FIG. 3 is a front view of the gearing assembly in accordance with some embodiments of the present invention.

In the preferred embodiment, the central gear 13 is rotatably engaged with the first planetary gear assembly 11 and the second planetary gear assembly 12 through the plurality of connecting shafts 14, as shown in FIGS. 2-3. The specific configuration of the connecting shafts 14 may vary in different embodiments, and it is contemplated that in some embodiments, other means may be utilized in order to rotatably engage the central gear 13 with the planetary gear assemblies, if feasible. However, in general, the purpose of the central gear 13 is to transmit angular force received from the propelling input 15 to both of the planetary gear assemblies simultaneously. When the propelling input 15 rotates, the central gear 13 is rotated, which is turn may be configured to rotate either the plurality of planet gears 19 or the sun gear 18 of the first planetary gear assembly 11 and the second planetary gear assembly 12 in the same direction about the central rotation axis 100 as the central gear 13. The two planetary gear assemblies may serve as the previously mentioned outputs of the gearing assembly 1 in order to drive a pair of wheels or other components. More specifically, in some embodiments, the sun gears 18 of the planetary gear assemblies may serve as the outputs, while in other embodiments, the aggregate rotation of the plurality of planet gears 19 about the central rotation axis 100 may serve as the outputs.

The steering input 16 is externally and operatively engaged with the ring gears 17 of both the first planetary gear assembly 11 and the second planetary gear assembly 12, such that the steering input 16 is configured to rotate the ring gear 17 of the first planetary gear assembly 11 and the ring gear 17 of the second planetary gear assembly 12 in opposing rotational directions about the central rotation axis 100. When implemented in a vehicle, the opposing rotational motion of the planetary gear assemblies allows the vehicle to change direction, given that the vehicle's wheels are driven by the planetary gear assemblies as previously discussed. While operating such a vehicle in a straight line, the ring gears 17 of the planetary gear assemblies and the steering input 16 do not rotate about the central rotation axis 100, while in different embodiments, either the planet gears 19 or the sun gears 18 rotate in order to drive the vehicle's wheels, as the movement of the planet gears 19 around the internal perimeter of the ring gears 17 does not impart any significant force to the ring gears 17. In some embodiments, the steering input 16 and the ring gears 17 of the first and second planetary gear assemblies are each helical bevel gears. In some embodiments, the steering input 16 may comprise a first input gear 40 and a second input gear 41, each external spur gears, with the first input gear 40 and the second input gear 41 being engaged with each other, the first input gear 40 being engaged with the ring gear 17 of the first planetary gear assembly 11, and the second input gear 41 being engaged with the ring gear 17 of the second planetary gear assembly 12; counter rotation of the ring gears 17 is similarly achieved in either case, though the steering inputs 16 require different interfaces to be driven due to the difference in gear type.

Figure 4:
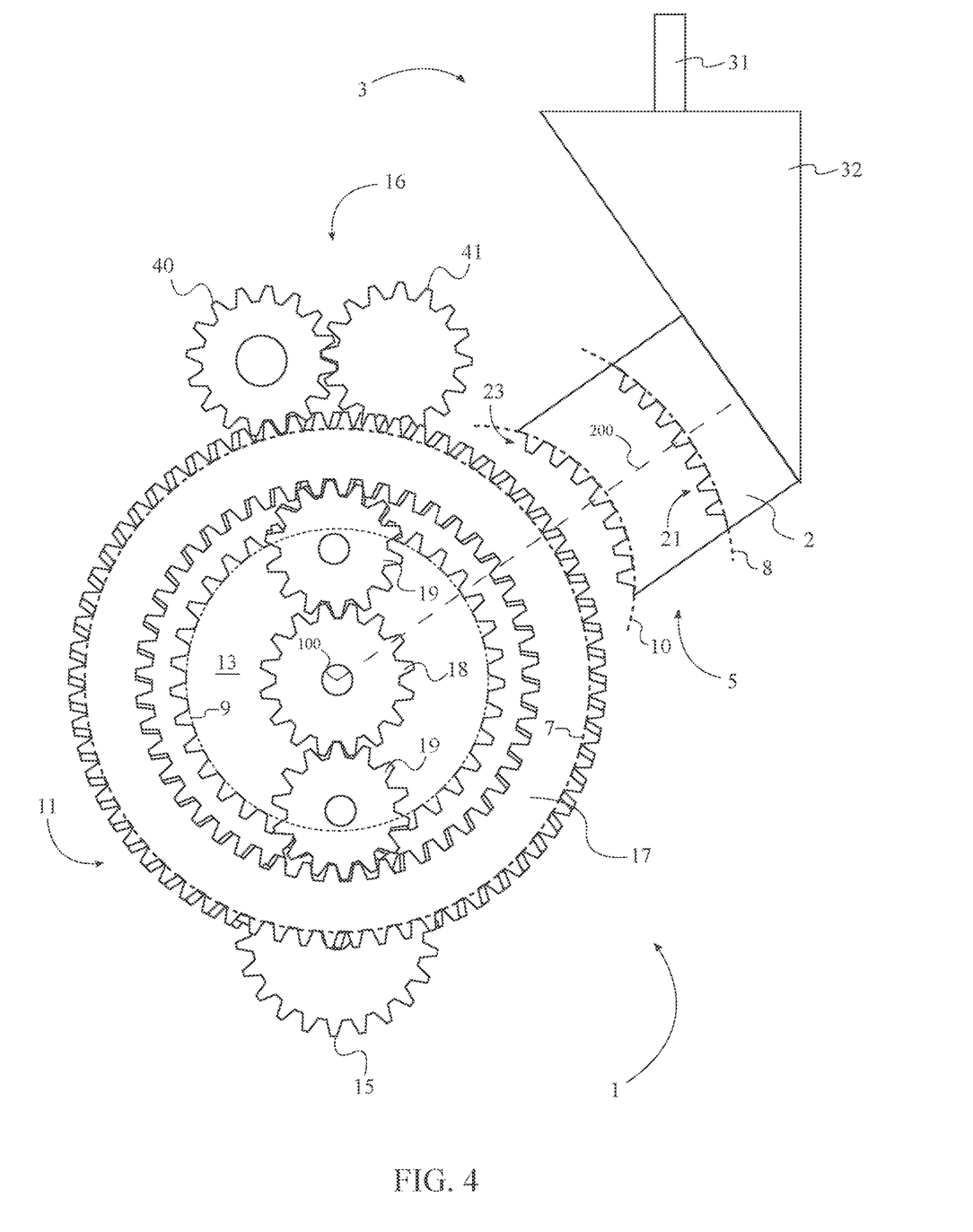
FIG. 4 is a side view of the present invention with the actuator mechanism in a disengaged position in accordance with some embodiments of the present invention.
Figure 5:
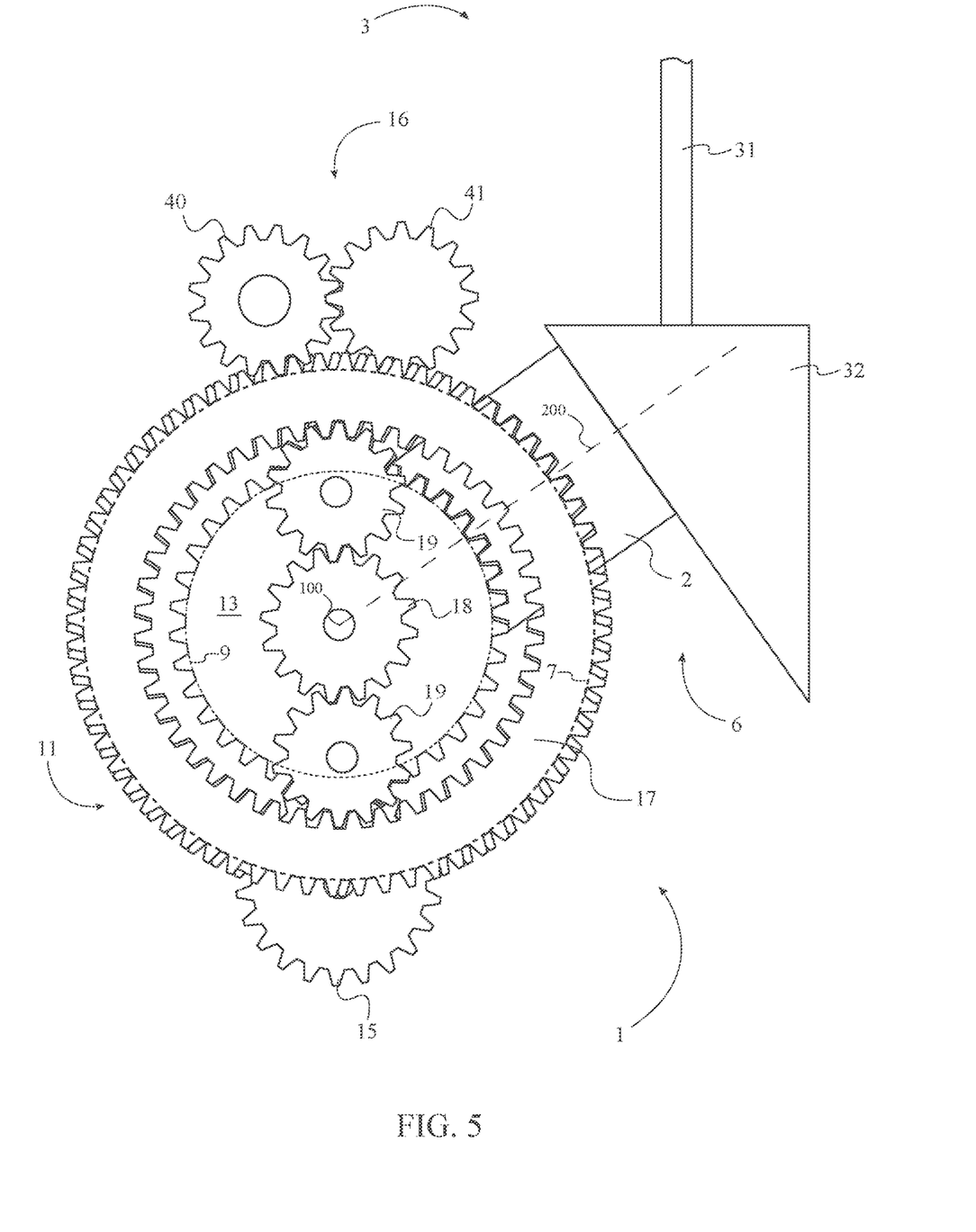
FIG. 5 is a side view of the present invention with the actuator mechanism in an engaged position in accordance with some embodiments of the present invention.

Finally, the actuator mechanism 3 is operatively connected to the gear engagement block 2, such that the actuator mechanism 3 is configured to displace the gear engagement block 2 between a disengaged position 5 and an engaged position 6, as shown in FIGS. 4-5. The gear engagement block 2 comprises a plurality of sets of gear teeth in order to mesh with the gearing assembly 1 in the engaged position 6.

In the preferred embodiment, in the engaged position 6, the gear engagement block 2 is externally engaged with the central gear 13, the first planetary gear assembly 11, and the second planetary gear assembly 12; thus, the first planetary gear assembly 11, the second planetary gear assembly 12, and the central gear 13 are restricted from rotating about the central rotation axis 100 when the gear engagement block 2 is in the engaged position 6. In other embodiments, the gear engagement block 2 may be configured to mesh with different components of the gearing assembly 1 as suitable in order to prevent any (significant) input or output motion of the gearing assembly 1. In the disengaged position 5, the gear engagement block 2 is retracted away from the gearing assembly 1 and does not interfere with the motion of the gearing assembly 1. In the preferred embodiment, the gear engagement block 2 is displaced from the disengaged position 5 along a line of travel 200 linearly toward the central rotation axis 100 into the engaged position 6, though it is contemplated that the actuator mechanism 3 may be configured according to any desired arrangement suitable for meshing the plurality of sets of gear teeth of the gear engagement block 2 with the gearing assembly 1. In some embodiments, the central gear 13, the ring gear 17 of the first planetary gear assembly 11, and the ring gear 17 of the second planetary gear assembly 12 are external spur gears, though the specific nature of the aforementioned gears may vary as suitable in different embodiments.

Figure 6:
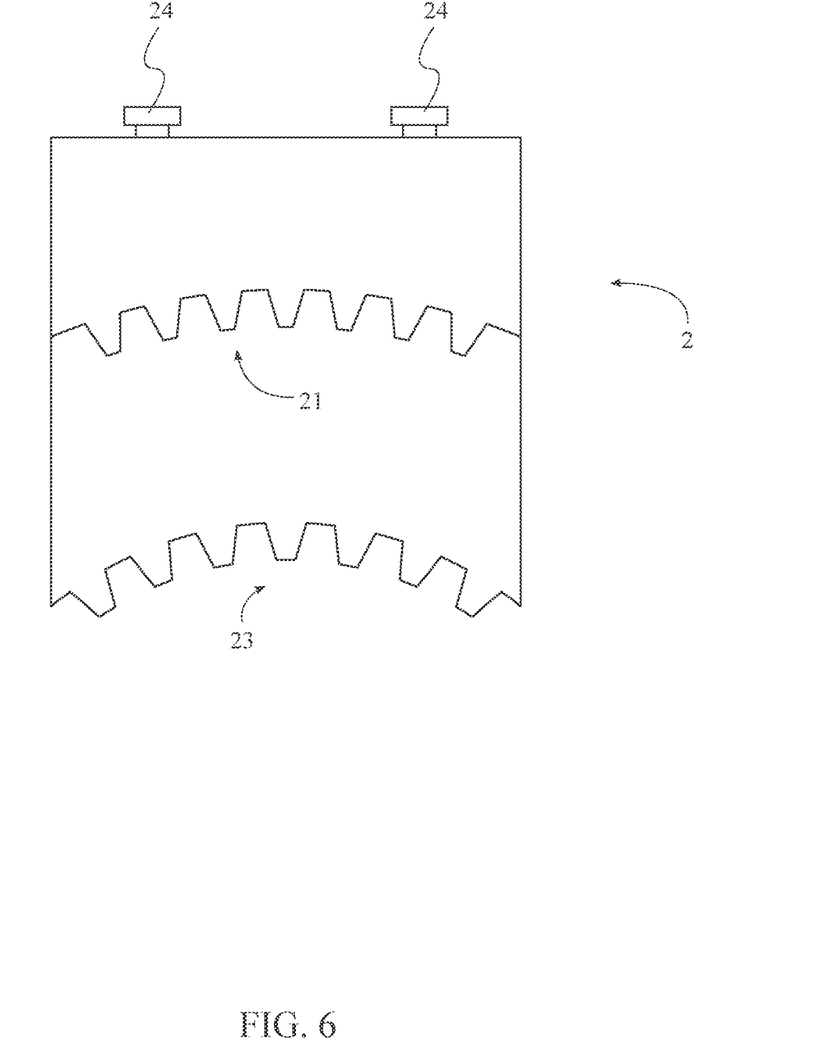
FIG. 6 is a side view of the gear engagement block in accordance with some embodiments of the present invention.
Figure 7:
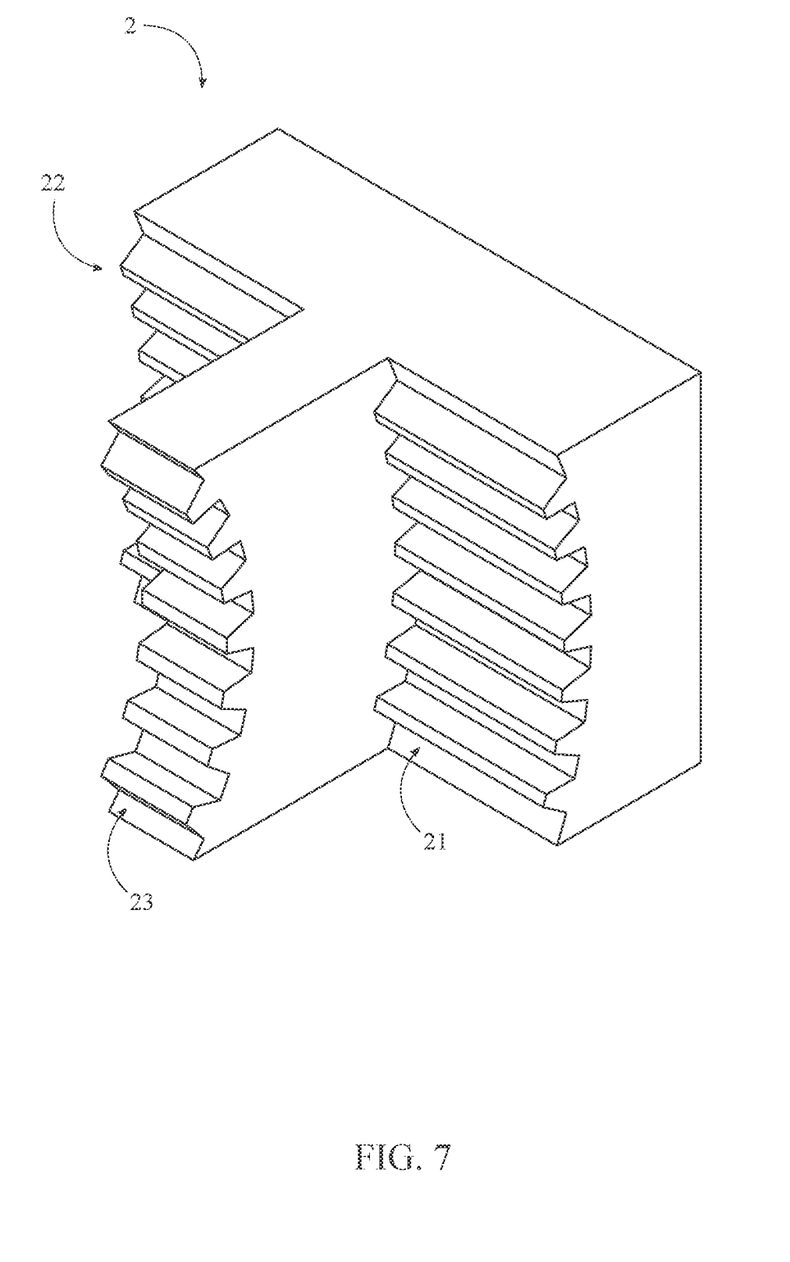
FIG. 7 is a perspective view of the gear engagement block in accordance with some embodiments of the present invention.

Referring to FIGS. 6-7, in order to mesh with the gearing assembly 1 in the preferred embodiment, the gear engagement block 2 comprises a first set of gear teeth 21, a second set of gear teeth 22, and a third set of gear teeth 23, all oriented parallel to each other; that is, facing the same direction, in order to correspond to the external geometry of the planetary gear assemblies and the central gear 13 in embodiments where the said gears are spur gears. In embodiments where the said gears of the gearing assembly 1 are bevel gears, the first set of gear teeth 21, the second set of gear teeth 22, and the third set of gear teeth 23 are bevel gear teeth. The third set of gear teeth 23 is positioned between the first set of gear teeth 21 and the second set of gear teeth 22. The first set of gear teeth 21, the second set of gear teeth 22, and the third set of gear teeth 23 are configured to simultaneously engage with the ring gear 17 of the first planetary gear assembly 11, the ring gear 17 of the second planetary gear assembly 12, and the central gear 13, respectively.

Figure 8:
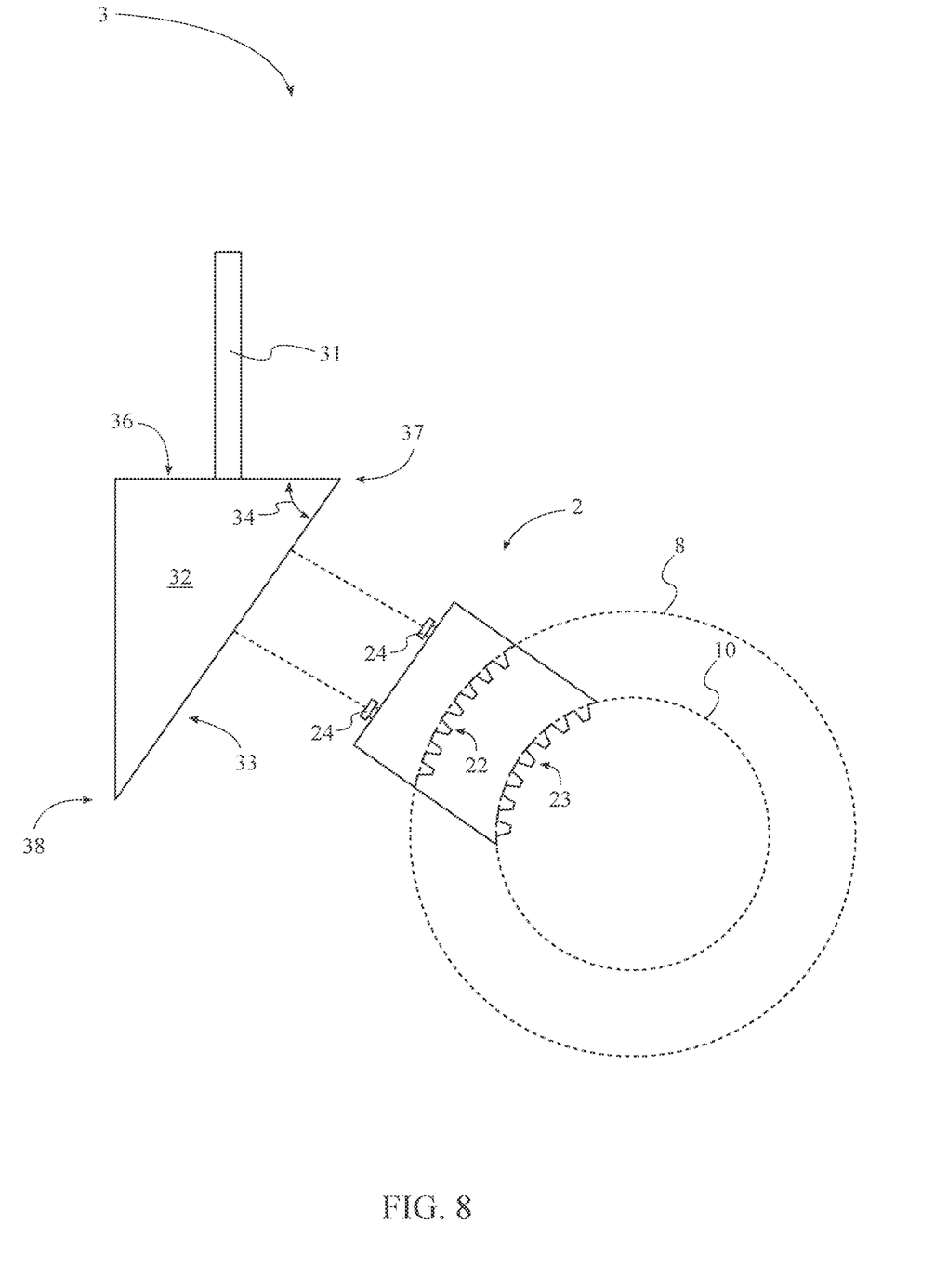
FIG. 8 is a side exploded view of the actuator mechanism in accordance with some embodiments of the present invention.

Moreover, referring to FIGS. 4, 5, and 8, in the preferred embodiment, the ring gear 17 has a first gear radius 7 for each of the first and second planetary gear assemblies, the central gear 13 has a second gear radius 9, the first set of gear teeth 21 and the second set of gear teeth 22 each have a first block radius 8, and the third set of gear teeth 23 each have a second block radius 10. Since the gears of the gearing assembly 1 are radial in geometry, the sets of gear teeth should have corresponding radial geometry in order to properly mesh with the gearing assembly 1. Thus, in the preferred embodiment, the first gear radius 7 of the ring gears 17 of the first planetary gear assembly 11 and the second planetary gear assembly 12 is equal to the first block radius 8 of the first set of gear teeth 21 and the second set of gear teeth 22, while the second gear radius 9 of the central gear 13 is equal to the second block radius 10 of the third set of gear teeth 23. In various embodiments, the sets of gear teeth may not necessarily be strictly required to have radial geometry corresponding to the radial geometry of the corresponding gears of the gearing assembly 1 in order to function, though it is considered advantageous and preferred.

As previously discussed, the actuator mechanism 3 serves to engage the gear engagement block 2 with the gearing assembly 1. While it is contemplated herein that the actuator mechanism 3 may take any form suitable to facilitating this function, in the preferred embodiment the actuator mechanism 3 is a linear cam mechanism configured to linearly displace the gear engagement block 2 radially toward the central rotation axis 100 of the gearing assembly 1. In some embodiments, the actuator mechanism 3 may be a pivoting external gear block. In other embodiments, the actuator mechanism 3 may take any other suitable form.

Figure 9:
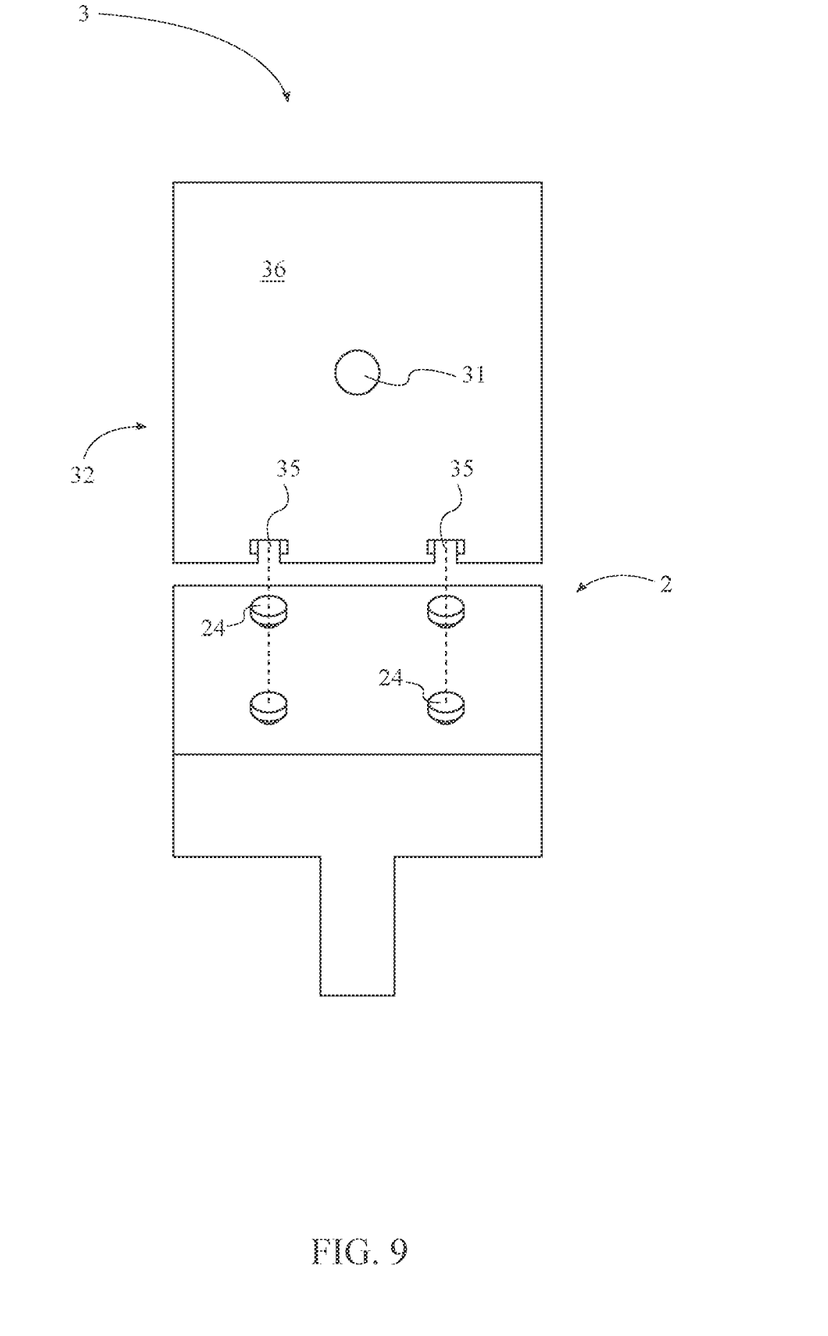
FIG. 9 is a top exploded view of the actuator mechanism in accordance with some embodiments of the present invention.
Figure 10:
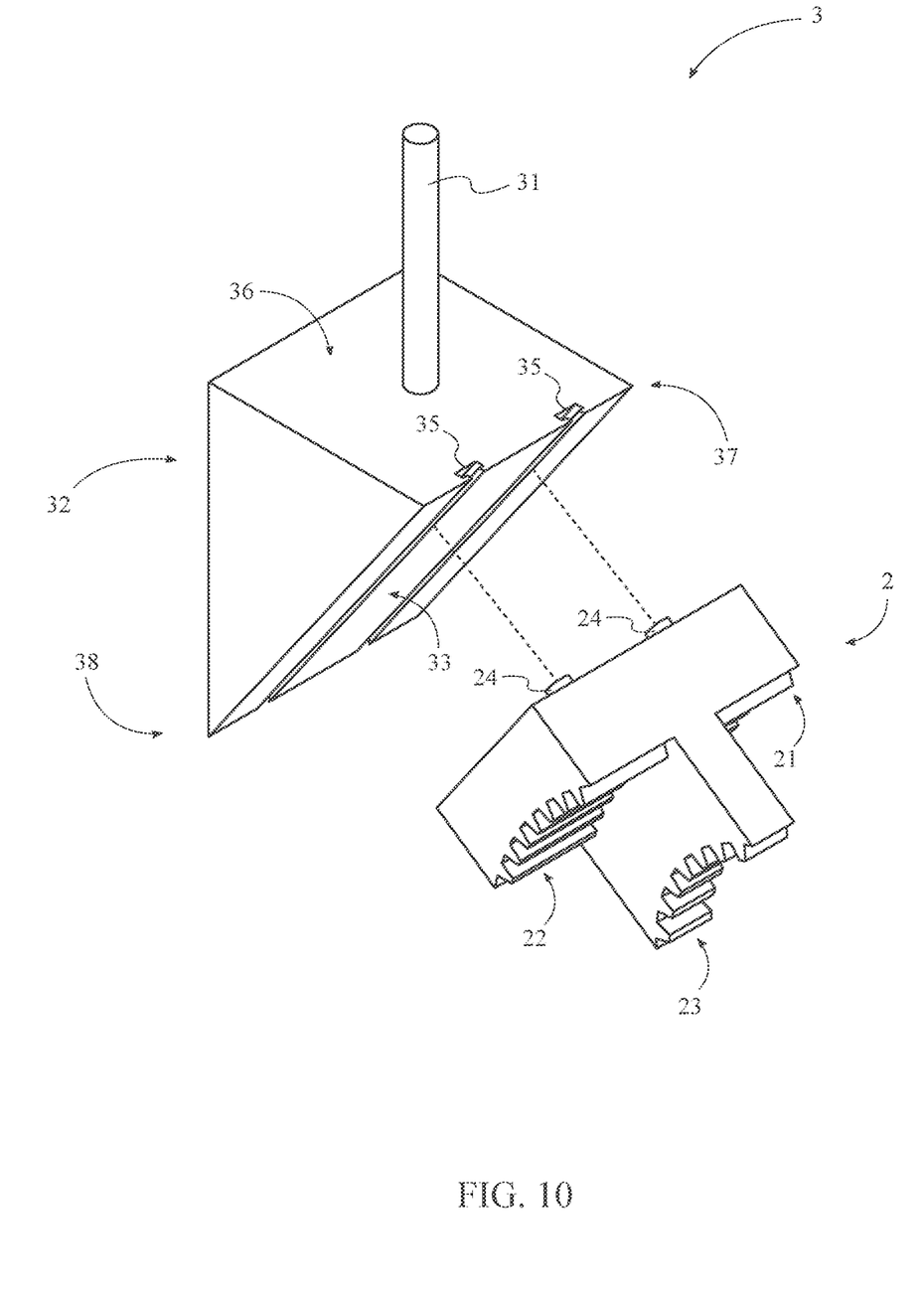
FIG. 10 is a perspective exploded view of the actuator mechanism in accordance with some embodiments of the present invention.

Referring to FIGS. 8-10, in the preferred embodiment, the actuator mechanism 3 comprises an actuator arm 31 and a guide block 32. The gear engagement block 2 is slidably connected to the guide block 32, and the actuator arm 31 is connected to the guide block 32 such that the guide block 32 is positioned between the actuator arm 31 and the gear engagement block 2. More particularly, the guide block 32 comprises a guide surface 33, a plurality of guide rails 35, and an actuator connection surface 36, while the gear engagement block 2 comprises a plurality of guide protrusions 24 that are positioned opposite the sets of gear teeth on the gear engagement block 2 and are preferably oriented normal to a body of the guide block 32. The plurality of guide protrusions 24 may be, for example, screw fasteners, with the heads of the screw fasteners constrained within the guide rails 35, though any suitable protrusions capable of mating with the guide rails 35 may be utilized. The plurality of guide rails 35 is connected to the guide surface 33 and each of the plurality of guide rails 35 is oriented parallel to each other, while the plurality of guide protrusions 24 is slidably engaged with the plurality of guide rails 35. Thus, a displacement path of the gear engagement block 2 is constrained to the length of the guide rails 35. The guide rails 35 extend between a proximal end 37 and a distal end 38, wherein the proximal end 37 is positioned adjacent to the actuator arm 31, and the distal end 38 is positioned opposite the proximal end 37 along the guide rails 35. It should be noted that any suitable means may be utilized to constrain the gear engagement block 2 along the displacement path for example, in some embodiments the guide rails 35 and the guide protrusions 24 may be swapped between the guide block 32 and the gear engagement block 2. More generally, the guide block 32 has a first linear mate portion, while the gear engagement block 2 has a second linear mate portion, with the first linear portion and the second linear mate portion being slidably engaged with each other.

In the preferred embodiment of the present invention, the actuator connection surface 36 is oriented at a specified angle 34 to the guide surface 33, preferably an acute angle, as shown in FIG. 8. More particularly, the guide block 32 has triangular geometry in the preferred embodiment; even more particularly, the guide block 32 has a right triangular cross section viewed from the side in the preferred embodiment. As such, the guide surface 33 is the hypotenuse of the right triangle, while the actuator connection surface 36 is the base of the right triangle, and the actuator arm 31 is perpendicularly connected to the actuator connection surface 36.

Thus, as the actuator arm 31 is advanced linearly in a direction normal to the actuator connection surface 36, the guide block 32 is similarly advanced, which in turn applies a force to the gear engagement block 2. In the disengaged position 5, the gear engagement block 2 is positioned furthest from the actuator connection surface 36, and closest to the height side of the right triangle. As the actuator arm 31 displaces the guide block 32 against the gear engagement block 2, the gear engagement block 2 is forced along a path relative to the guide block 32 parallel to the hypotenuse, toward the base and away from the height of the right triangle. Thus, in order to implement this arrangement, the orientation of the guide block 32 should be such that the displacement path of the gear engagement block 2 intersects the central rotation axis 100.

The three gear meshes will typically not all line up together rotationally, but further vehicle minor motion such as rocking can cause relative rotational motion of the gears to self-adjust to further engage the teeth of the gear engagement block 2. A spring loading on the brake actuation input can facilitate this self-adjustment.

Although the invention has been explained in relation to its preferred embodiment, it is to be understood that many other possible modifications and variations can be made without departing from the spirit and scope of the invention as hereinafter claimed.

What is claimed is:

1. A gearbox parking brake comprises:
   a gearing assembly comprising a first planetary gear assembly, a second planetary gear assembly, a central gear, a plurality of connecting shafts, a propelling input, and a steering input;
   a gear engagement block;
   an actuator mechanism;
   the first planetary gear assembly, the second planetary gear assembly, and the central gear being concentrically positioned about a central rotation axis;
   the central gear being positioned between the first planetary gear assembly and the second planetary gear assembly;
   the first planetary gear assembly and the second planetary gear assembly each comprising a ring gear, a sun gear, and a plurality of planet gears;
   each of the plurality of planet gears being operatively engaged between the sun gear and the ring gear for both the first planetary gear assembly and the second planetary gear assembly;
   the central gear being rotatably engaged with the first planetary gear assembly and the second planetary gear assembly through the plurality of connecting shafts;
   the propelling input being operatively engaged with the central gear, wherein the propelling input is configured to transmit angular force from a power source to the central gear in order to rotate the central gear about the central rotation axis;
   the steering input being externally and operatively engaged with the ring gears of both the first planetary gear assembly and the second planetary gear assembly, wherein the steering input is configured to rotate the ring gear of the first planetary gear assembly and the ring gear of the second planetary gear assembly in opposing rotational directions about the central rotation axis; and
   the actuator mechanism being operatively connected to the gear engagement block, wherein the actuator mechanism is configured to displace the gear engagement block between a disengaged position and an engaged position, wherein the gear engagement block is externally engaged with the central gear, the first planetary gear assembly, and the second planetary gear assembly in the engaged position, and wherein the first planetary gear assembly, the second planetary gear assembly, and the central gear are restricted from rotating about the central rotation axis when the gear engagement block is in the engaged position.

2. The gearbox parking brake as claimed in claim 1, wherein the central gear, the ring gear of the first planetary gear assembly, and the ring gear of the second planetary gear assembly are external spur gears.

3. The gearbox parking brake as claimed in claim 1 comprises:

the gear engagement block comprises a first set of gear teeth, a second set of gear teeth, and a third set of gear teeth;

the first set of gear teeth, the second set of gear teeth, and the third set of gear teeth being oriented parallel to each other;

the third set of gear teeth being positioned between the first set of gear teeth and the second set of gear teeth; and the first set of gear teeth, the second set of gear teeth, and the third set of gear teeth being configured to simultaneously engage with the ring gear of the first planetary gear assembly, the ring gear of the second planetary gear assembly, and the central gear, respectively.

4. The gearbox parking brake as claimed in claim 3 comprises:

a first gear radius of the ring gears of the first planetary gear assembly and the second planetary assembly being equal to a first block radius of the first set of gear teeth and the second set of gear teeth; and a second gear radius of the central gear being equal to a second block radius of the third set of gear teeth.

5. The gearbox parking brake as claimed in claim 1, wherein the actuator mechanism is a pivoting external gear block.

6. The gearbox parking brake as claimed in claim 1, wherein the actuator mechanism is a linear cam mechanism configured to linearly displace the gear engagement block radially toward the central rotation axis.

7. The gearbox parking brake as claimed in claim 1 comprises:

the actuator mechanism comprising an actuator arm and a guide block;

the gear engagement block being slidably connected to the guide block;

the actuator arm being connected to the guide block; and the guide block being positioned between the actuator arm and the gear engagement block.

8. The gearbox parking brake as claimed in claim 7 comprises:

the guide block comprising a guide surface, a plurality of guide rails, and an actuator connection surface;

the gear engagement block further comprises a plurality of guide protrusions;

the plurality of guide rails being positioned on the guide surface;

the plurality of guide rails being oriented parallel to each other;

the plurality of guide protrusions being slidably engaged with the plurality of guide rails;

the actuator connection surface being oriented at a specified angle to the guide surface; and the actuator arm being perpendicularly connected to the actuator connection surface.

9. The gearbox parking brake as claimed in claim 8, wherein the specified angle is an acute angle.

\* \* \* \* \*